Figure 1:
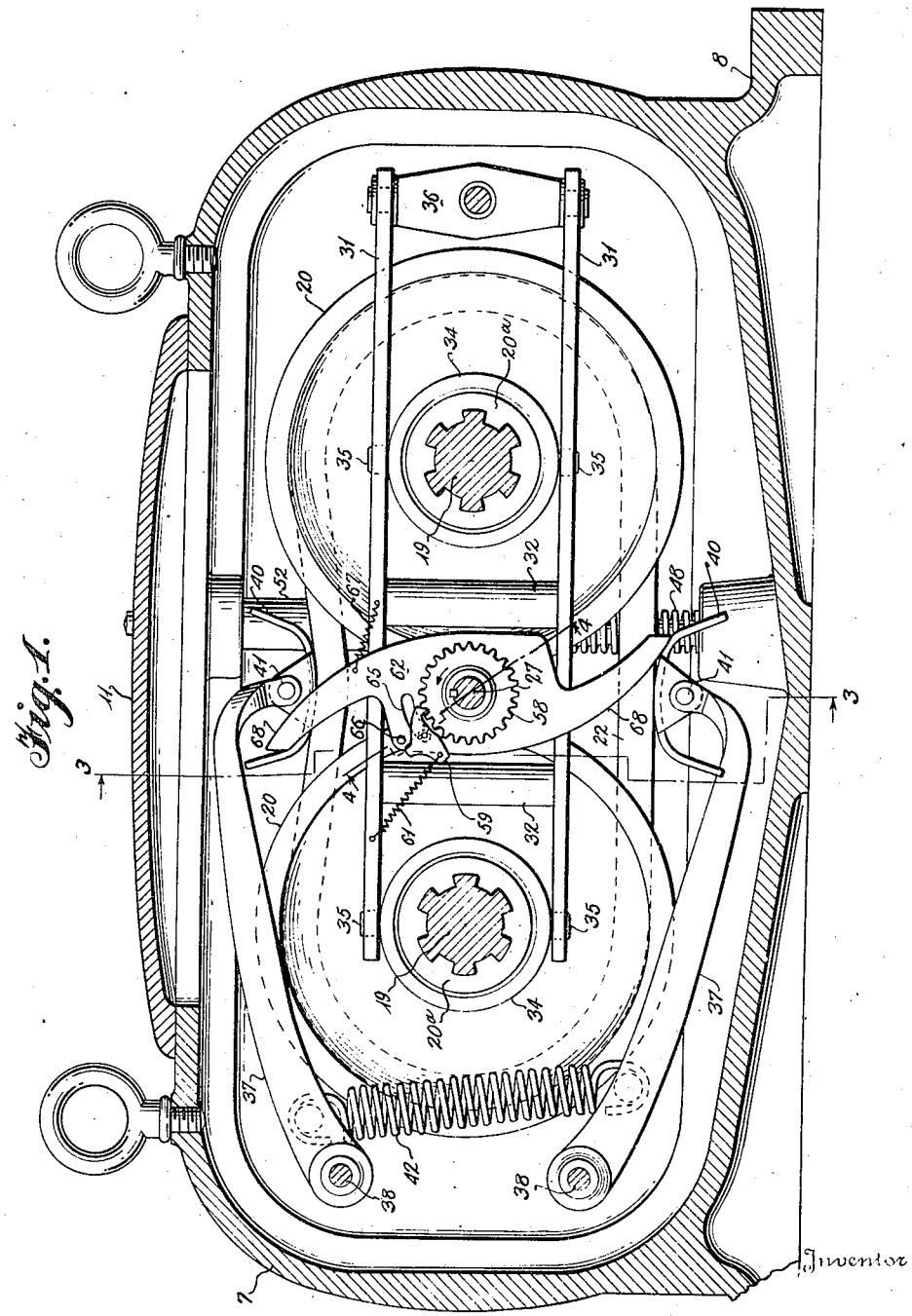

Sept. 21, 1943. H. G. KELLER 2,329,911
AUTOMATIC CHAIN OR BELT TENSIONING MECHANISM
Filed Aug. 17, 1942 4 Sheets-Sheet 1

Inventor
Henry G. Keller
By L. Donald Myers
Attorney

Sept. 21, 1943. H. G. KELLER 2,329,911
AUTOMATIC CHAIN OR BELT TENSIONING MECHANISM
Filed Aug. 17, 1942 4 Sheets-Sheet 2

Inventor
Henry G. Keller

Sept. 21, 1943.   H. G. KELLER   2,329,911
AUTOMATIC CHAIN OR BELT TENSIONING MECHANISM
Filed Aug. 17, 1942   4 Sheets-Sheet 3

Inventor
Henry G. Keller
By L. Donald Myers
Attorney

Sept. 21, 1943.   H. G. KELLER   2,329,911
AUTOMATIC CHAIN OR BELT TENSIONING MECHANISM
Filed Aug. 17, 1942   4 Sheets-Sheet 4

Inventor
Henry G. Keller
Attorney

Patented Sept. 21, 1943

2,329,911

UNITED STATES PATENT OFFICE 2,329,911

AUTOMATIC CHAIN OR BELT TENSIONING MECHANISM

Henry G. Keller, Glenside, Pa., assignor to Link-Belt Company, a corporation of Illinois Application August 17, 1942, Serial No. 455,096

26 Claims. (Cl. 74—230.17)

This invention relates to new and useful improvements in mechanism for automatically maintaining a desired amount of tension on the driving chains or belts of variable speed transmission gearing.

In my patent numbered 2,266,687, issued December 16, 1941, I have disclosed and claimed mechanisms which are capable of maintaining at all times a uniform maximum tension on the driving chains or belts of variable speed transmission gearing. The mechanisms of said patent operate on the principle of constantly applying one force to the chain or belt in such a manner as to produce a sag therein and of constantly applying a second force to the chain or belt in such a manner as to reduce, but not eliminate, the amount of sag. These two opposed forces will apply the maximum tension to the driving chain or belt only when they are neatly balanced, or in a state of equilibrium. As the driving chain or belt develops increments of wear or stretch, it becomes longer. This increase in length throws the opposed forces out of balance. Because the opposed forces will always seek a state of balance or equilibrium whenever that condition does not exist, they will immediately reestablish that condition and the maximum tension will again be applied.

As a result of extensive use of mechanisms embodying the above noted principle, it has been determined that although the degree of maximum tension applied to the driving chain or belt of a given transmission gearing unit is maintained uniform at all times, the degrees of maximum tension applied to the driving chains or belts of different gearing units are not exactly the same. This difference results from normal manufacturing tolerances which are allowed for the commercial production of such gearing units, and particularly the springs of such units which are employed for creating the oppositely acting forces. The degree of maximum tension maintained for each unit will depend upon just what relative positions or settings are assumed by the force delivering instrumentalities when the opposed springs assume their state of balance or equilibrium. However, by exercising a reasonable amount of care in selecting and matching the springs that are assembled in each transmission gearing unit, and by regulating the setting or position assumed by the force applying instrumentalities when the opposed force producing springs are in a state of balance or equilibrium, the differences between the degrees of maximum tension maintained in different transmission units may be held within entirely satisfactory limits.

The automatic driving chain or belt tensioning mechanism embodying this invention is an improvement over the mechanisms of my aforesaid patent because it operates on the principle of constantly applying only a sag producing force to the chain or belt to maintain the desired degree of maximum tension, and, when an increment of wear or stretch develops which will produce such an elongation of the driving chain or belt as will lower the degree of tension provided by the sag producing force below the desired maximum, of momentarily applying a force to the driving chain or belt in such a manner as to eliminate the increase in sag that resulted from such increment of wear or stretch. The extent or period of application of the sag eliminating force is automatically controlled so that it will do no more than eliminate the aforesaid increase in sag.

It will be apparent, therefore, that the maintaining of a uniform maximum tension with this improved apparatus is not dependent upon the balancing of two forces and the position or setting assumed by the force applying instrumentalities when said forces are balanced. Instead, it is only necessary to employ a force developing means which will be capable of producing the desired degree of maximum tension on the driving chain or belt by creating a sag therein and employ a second force developing means, having a power factor superior to that of the sag developing force to any desired degree, for eliminating any additional sag that develops in the driving chain or belt.

It is the primary object of this invention to provide an automatic tensioning mechanism for chains or belts of variable speed transmission gearing which will apply and maintain a tension within comparatively narrow limits regardless of load or speed conditions.

A further important object of the invention is to provide automatic tensioning mechanism which will apply a suitable tension to a driving chain or belt by constantly applying a sag producing force thereto and which will maintain said tension within comparatively narrow limits at all times by applying a sag eliminating force to the driving chain or belt only when the depth of the sag therein exceeds that which exists when the maximum tension is applied.

Other objects and advantages of the invention will be apparent during the course of the following description.

Figure 2:
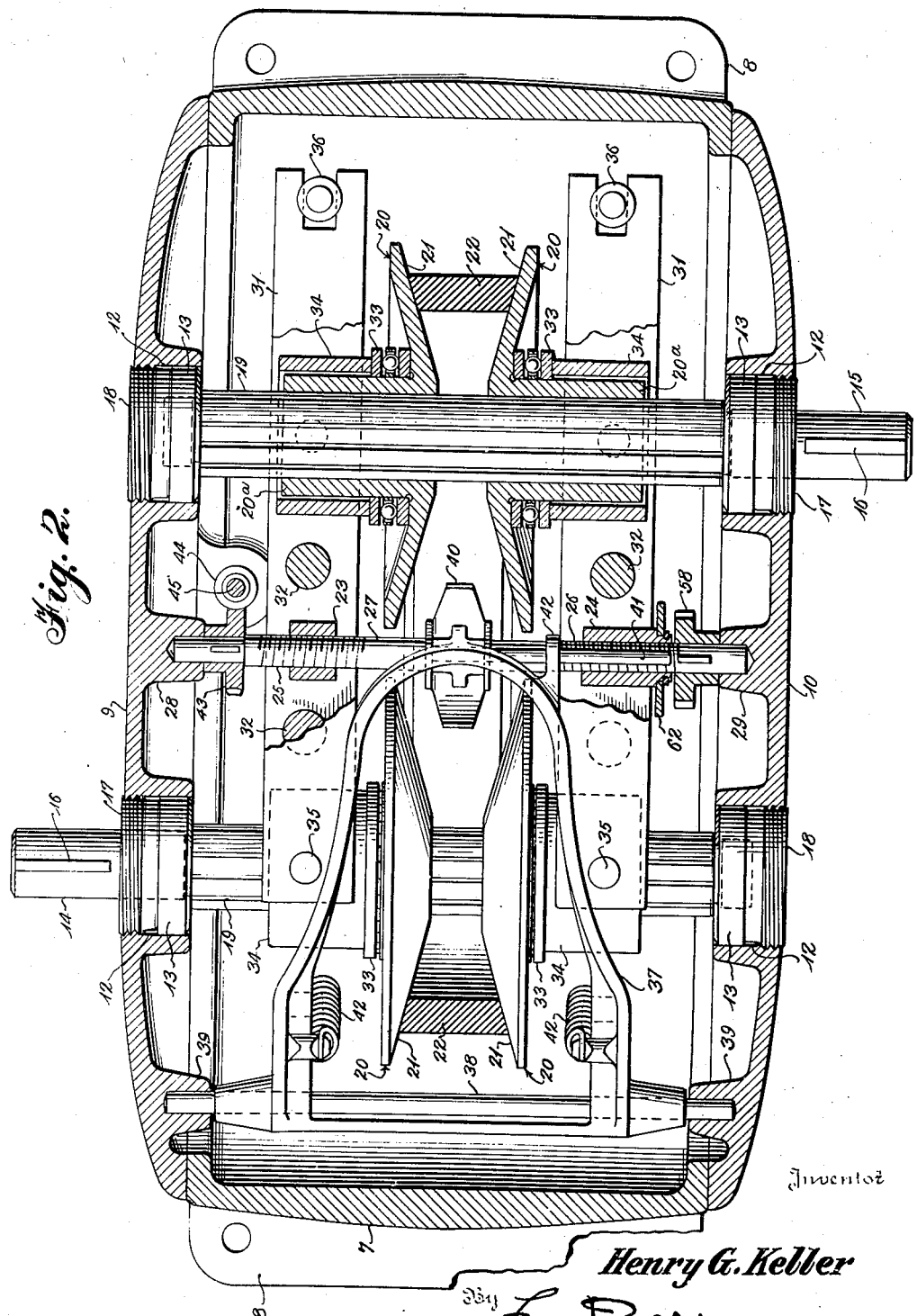
Figure 3:
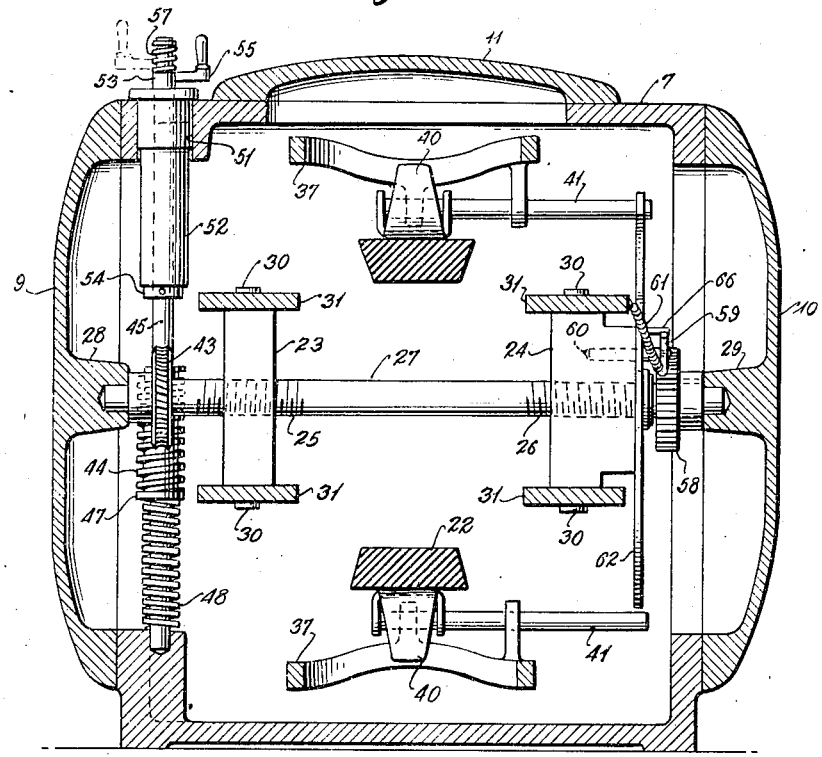
Figure 4:
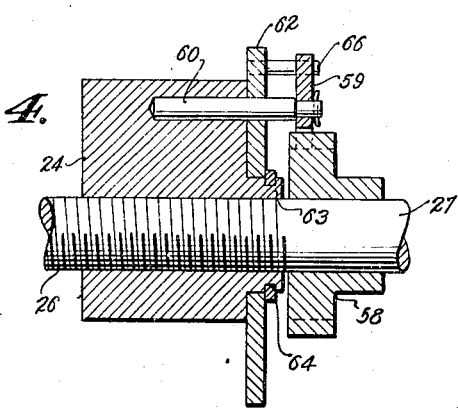
Figure 5:
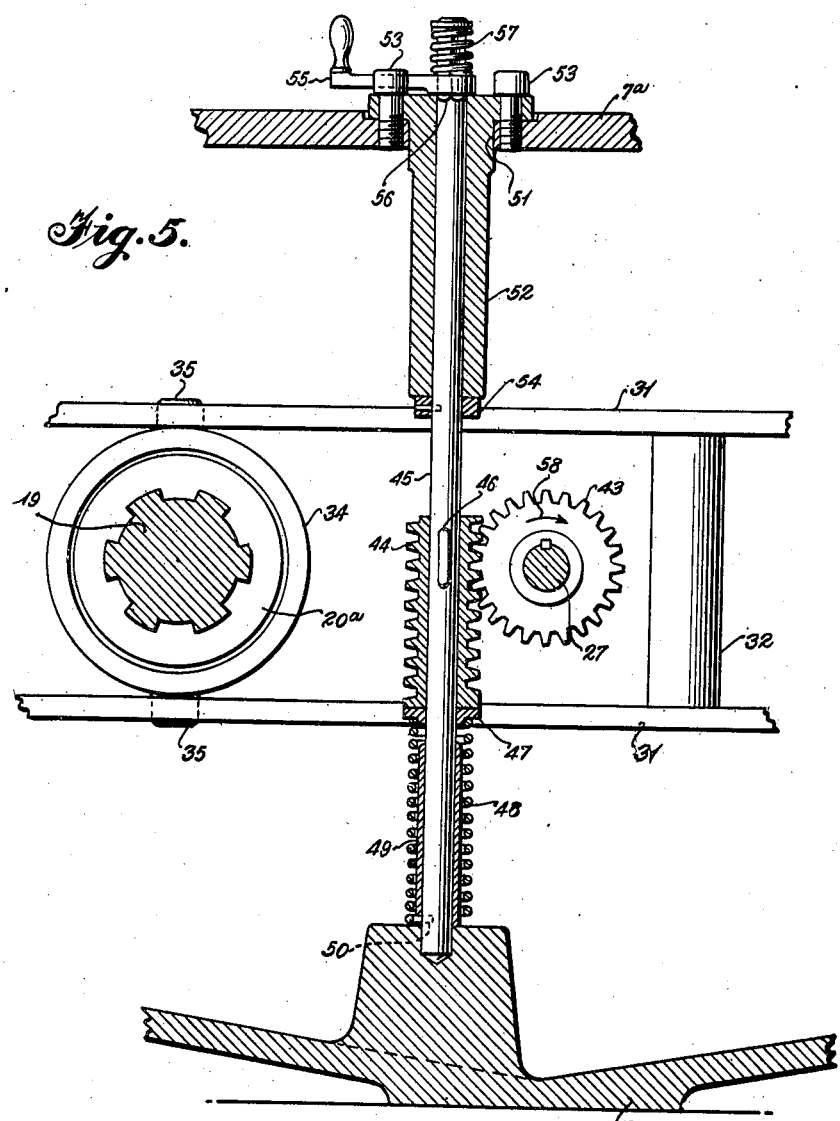
Figure 6:
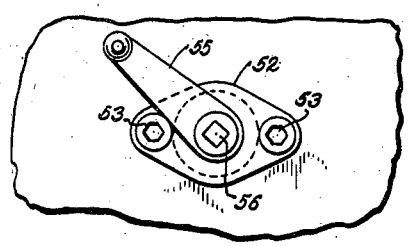

In the accompanying drawings forming a part of this specification, and in which like numerals are employed to designate like parts throughout the same:

Figure 1 is a vertical sectional view of a variable speed transmission gearing unit which has applied thereto the automatic chain or belt tensioning mechanism embodying this invention, Figure 2 is a horizontal sectional view of the transmission gearing unit illustrated in Fig. 1, Figure 3 is a transverse vertical sectional view taken on line 3—3 of Fig. 1, Figure 4 is a detail sectional view taken on line 4—4 of Fig. 1, Figure 5 is a detail vertical sectional view of a portion of the tensioning mechanism embodying this invention, and Figure 6 is a detail plan view of the reset crank of said mechanism.

In the drawings, wherein for the purpose of illustration is shown the preferred embodiment of this invention, and first particularly referring to Figs. 1, 2, and 3, there is disclosed a variable speed transmission gearing unit which includes the housing 7, having a base portion 8, and having opposite side and top openings. Figs. 2 and 3 disclose the side openings as being closed by side plates 9 and 10. Figs. 1 and 3 disclose the top opening of the casing as being closed by a removable inspection cover plate 11.

Fig. 2 discloses the two side plates 9 and 10 as having formed therein the bearing openings 12 in which suitable bearings 13 are mounted. These bearings are adapted to support the constant speed driver shaft 14 and the variable speed driven shaft 15. It will be seen that each one of these two shafts has one end projecting outwardly of the housing through one of its bearing openings 12. These projecting shaft portions are adapted to have mounted thereon suitable power transmitting devices and are provided with key ways 16 for that purpose. Bearing caps 17 of annular formation are positioned in the bearing openings 12 through which the ends of the shafts 14 and 15 project. The remaining two bearing openings 12 are closed by solid bearing caps 18. All of the caps 17 and 18 are threadedly connected to the side plates 9 and 10 so that they may be removed whenever it becomes necessary to repair or replace the shaft bearings 13.

Both of the shafts 14 and 15 are provided with splined portions 19 for having axially slidably mounted thereon the conical wheels or cones 20. Each pair of these wheels forms a V-pulley for its respective shaft. Each wheel 20 is provided with a conical contact surface or face 21 and a relatively long hub portion 20a. These hub portions allow for axial sliding movement of the wheels 20 toward and away from each other while being drivingly connected to its shaft by means of the splines 19. A flexible transmission member 22 is illustrated in Figs. 1 and 2 as being trained over the expansible and contractible V-pulleys which are formed by the pairs of wheels 20. The wheels of the two pulleys are illustrated as being positioned with their respective contact surfaces 21 uniformly spaced so that both pulleys will have the same effective diameter. It is to be understood, however, that the wheels may be spaced different distances in the two pulleys so as to have different effective diameters. When the pulley of the driver shaft 14 has the larger effective diameter, the speed of rotation of the driven shaft 15 will be greater than the speed of rotation of the driver shaft. When the relative effective diameters are reversed, of course, the speed of rotation of the driven shaft 15 will be less than the speed of rotation of the driver shaft. The mechanism for accomplishing such changes in the effective diameters of the two V-pulleys will be described in detail at a later point.

The contact or working faces 21 of the wheels 20 are illustrated in Fig. 2 as being smooth while the flexible transmission member 22 is illustrated as taking the form of a V-belt which is intended to frictionally engage the surfaces or faces 21. It will be understood, however, that the faces 21 of the wheels 20 may be formed as disclosed in the G. J. Abbott Patent No. 1,637,402, issued August 2, 1927, while the flexible transmission member 22 may be formed in the manner shown in the G. J. Abbott Patent No. 1,814,883, issued July 13, 1931. Smooth and toothed faced pulley wheels with appropriately constructed flexible transmission members are well known in the art and for that reason it is believed to be unnecessary to disclose in detail both of these types of gearings. Therefore, in the specification and claims the expression "a contractible and expansible V-pulley" is intended to embrace wheels having either smooth or toothed contact surfaces or faces while the expression "a flexible transmission member" is intended to embrace either belts or chains of appropriate construction for use on these two different types of V-pulleys.

It was pointed out above that the wheels 20 are axially slidably splined on the shafts 19 so that they may be expanded and contracted to vary the effective diameters of the pulleys formed by the same. As one pulley is caused to expand, the other pulley will be correspondingly contracted. The effective diameter of a pulley is increased by forcing its opposed wheels 20 toward each other. When the effective diameter is to be reduced, the wheels 20 are permitted to move away from each other. The mechanism employed for forcing the wheels of one pulley toward each other simultaneously operates to permit the wheels of the remaining pulley to expand or move away from each other. The diameters of the two pulleys, therefore, are increased and decreased in proportion with each other.

Figs. 2, 3 and 4 disclose fulcrum blocks 23 and 24 which are adjustably mounted on the oppositely threaded portions 25 and 26 of an adjusting screw 27 which is journaled in bearing enlargements 28 and 29 formed on the side plates 9 and 10 respectively. Adjusting screw 27 is arranged in parallelism with and between the driver shaft 14 and driven shaft 15 while the screw threaded portions 25 and 26 of the adjusting screw are positioned so as to arrange the pivot or fulcrum blocks 23 and 24 on opposite sides of the two V-pulleys. Fig. 3 illustrates each pivot or fulcrum block as being provided with pivot studs 30 on which are mounted the operating levers 31 for pivotal movement. It will be seen, therefore, that each one of the fulcrum blocks 23 and 24 has pivotally mounted thereon two controlling or operating levers 31. Figs. 1 and 2 disclose each pair of controlling or operating levers 31 as being provided with a pair of spacing and bracing members 32 with these members 32 being arranged on opposite sides of their fulcrum blocks 23 and 24. Any suitable means may be employed for attaching the spacing and bracing members 32 rigidly to the operating or controlling levers 31.

Each pulley wheel hub 20a has mounted thereon a ball thrust bearing 33 with one race engaging the back or outer face of its wheel. A thrust yoke 34 bears against the remaining race of each one of the thrust bearings 33. These thrust yokes are provided with studs 35 that are arranged to be received in suitable openings formed in the controlling or operating levers 31, as is best illustrated in Figs. 1, 2 and 5. It will be seen from this arrangement that each one of the pulley wheels 20 is backed up by a ball thrust bearing 33 and a thrust yoke 34 while each one of the thrust yokes is connected to both of the operating or controlling levers 31 that are arranged on one side of the two V-pulleys.

Whenever the respective effective diameters of the two V-pulleys are to be changed relative to each other, it is necessary to pivot the control levers 31 about their studs 30. To accomplish this pivotal movement of the controlling or operating levers control blocks 36 are connected to ends of the levers 31 in the manner illustrated in Figs. 1 and 2. Suitable speed control mechanism, not illustrated in detail in these two figures, is provided for moving the control blocks 36 toward and away from each other. Reference may be made to my prior Patent No. 2,266,687 for a complete disclosure of this control mechanism.

The introductory portion of the specification points out that the desired tension is applied to the flexible transmission member 22 in accordance with this invention by producing a predetermined amount of sag in the flexible transmission member and by employing additional mechanism for maintaining the depth of the sag within narrow limits. The sag is normally produced in the non-driving run of the flexible transmission member. It is pointed out in my prior patent that mechanism for producing a sag in a flexible transmission member becomes less effective as the depth of the sag increases. For that reason, the sag producing mechanism can only maintain the desired maximum tension in the flexible transmission member when the depth of the sag is within certain values. These certain values, therefore, determine the normal amount of sag to be provided in the transmission member. When increments of wear or stretch develop in the flexible transmission member, the length of the member increases and the depth of the sag naturally increases. Therefore, it is necessary to eliminate appreciable increase in the depth of sag as it develops to permit the sag producing mechanism to maintain the flexible transmission member tensioned within the desired limits.

The sag producing mechanism is best illustrated in Figs. 1, 2 and 3. It consists of a pair of lever members 37 which are pivotally mounted on the shafts 38 that extend transversely of the housing 7 for being journaled at their opposite ends in the side plates 9 and 10 by means of the raised bearings 39. A transmission member engaging shoe 40 is connected to the outer end of each lever member 37 by means of a combined pivot and actuating pin 41. Fig. 2 clearly illustrates one of the pins 41 as projecting laterally of its lever 37. A bracing arm 42 extends from the lever 37 to support this projecting portion of the pin 41. The function of this projection will be explained in detail at a later point. Fig. 3 discloses the pins 41 for both of the shoes 40 as projecting laterally of the shoes. It will be explained at a later point that for any given direction of travel of the flexible transmission member 22 only one of these pins 41 will be required to have its projecting portion perform an additional function. However, as the transmission may be driven in either direction, the pins for both flexible transmission member engaging shoes 40 must be elongated in the manner illustrated.

It will be seen by inspecting Figs. 1, 2 and 3 that the shoes 40 engage both the active, or driving, and the inactive, or return, runs of the flexible transmission member 22 between the two V-pulleys. Although shoes have been illustrated as being pivotally connected to the outer ends of the sag producing levers 37, it will be understood by those skilled in the art that suitable rollers, or the like, may be substituted and have rolling contact with the outer surface of the flexible transmission member.

To apply the desired amount of force to the levers 37 to produce a sag in the non-driving run of the flexible transmission member, tension springs 42 are provided. These springs are suitably connected at their opposite ends to the levers 37 adjacent their supporting shafts 38. The sag is produced in the non-driving run of the flexible transmission member as a result of the force developed by the springs 42 and delivered to both runs of the transmission member by the shoes 40. The application of pressure to the flexible transmission member naturally tensions this member. The tension will vary in intensity as the angle formed by the sides of the sag in the flexible transmission member varies. The tension produced by the spring loaded levers 37 will decrease as the included angle of the sides of the sag decreases, or as the depth of the sag increases. This reduction in tension results not only from the contraction of the springs 42 but also as a result of the decrease in the included angle formed by the sides of the sag. For the sag producing mechanism to maintain the desired maximum tension at all times, therefore, the sag must not be permitted to increase in depth beyond what has been determined to be a normal amount; i. e., the depth at which the force of the sag producing mechanism will be effective to produce the desired tension.

The mechanism that is employed for eliminating any sag which develops beyond the normal amount will now be described. Figs. 2, 3 and 5 disclose the tension adjusting screw 27 as having keyed on one lower portion thereof the worm gear 43. This worm gear meshes with the worm 44 that is slidably mounted on the reset shaft 45 and is held against rotation with respect to this shaft by means of the key 46. A washer 47 bears against the lower end of the worm 44 and is engaged by the upper end of the actuating spring 48 which is on the lower portion of the reset shaft 45. A stop sleeve 49 is fitted on the reset shaft 45 within the actuating spring 48 and is held in place by the pin 50. This stop sleeve 49 is of proper length to engage the washer 47 for limiting the degree or extent to which the actuating spring 48 may be compressed.

The top wall 7a of the housing 7 is provided with an opening 51 to receive the removable mounting sleeve 52 which is held in place by the headed screws 53. This mounting sleeve 52 acts as a bearing for the upper end of the reset shaft 45. A stop collar 54 is pinned to the reset shaft 45 and bears against the inner end of the sleeve 52 so as to prevent vertical movement of the reset shaft 45 relative to the sleeve 52.

A reset crank 55 is slidably connected to the upper, projecting, squared end portion 56 of the reset shaft 45. This reset crank is normally maintained in contact with the upper face of the supporting sleeve 52 by means of the lock spring 57. This lock spring maintains the reset crank 55 in a position where it will engage one or the other of the heads of the securing screws 53. This engagement prevents rotation of the reset shaft 45. When it is desired to rotate this shaft by means of the reset crank 55, the crank is moved upwardly to compress the lock spring 57 and to free the reset crank 55 from the holding screws 53.

By inspecting Fig. 5, it will be seen that the worm 44 occupies a position where the actuating spring 48 is compressed almost to the maximum amount; that is to say, the washer 47 is spaced only slightly from the adjacent end of the stop sleeve 49. With the worm 44 occupying this position and being prevented from rotating with respect to the reset shaft 45 by means of the key 46 and with the reset crank 55 engaging one of the headed stop pins 53 so as to prevent rotation of the reset shaft 45, the force of the actuating spring 48 will tend to move the worm 44 upwardly. Any upward movement of the worm 44 will cause the same to act as a rack to rotate the worm gear 43 in the direction of the arrow 56. Should the worm gear 43 be rotated by vertical movement of the worm 44, the adjustment screw 27 would also be rotated. Rotation of the adjustment screw in the direction of the arrow 56 would bring about movement of the fulcrum blocks 23 and 24 toward each other. This approach movement of the fulcrum blocks would cause the controlling or actuating levers 31 to be moved toward each other for contracting the pairs of wheels 20 of both of the V-pulleys. Contracting of the pulleys would result in increasing their effective diameters and would bring about elimination of sag in the non-driving run of the flexible transmission member 22.

Of course, vertical upward movement of the worm 44 is accomplished by the spring 48 and is accompanied by expansion of said spring. It is not desirable to permit the spring 48 to expand too much because the spring must be able to deliver a predetermined amount of force throughout its entire working range of expansion. The stop collar 54, therefore, will function to limit the vertical upward movement of the worm 44 and the expansion of the spring 48.

When the spring 48 has been expanded to its permissible limit, it becomes necessary to reset or recompress the spring. This is accomplished by lifting the reset crank 55 upwardly into the position illustrated in dotted lines in Fig. 3, or into a position where it will clear the stop screws 53. When the reset crank 55 has been freed, it can be turned in a clockwise direction for a right hand thread, as viewed from above, for rotating the reset shaft 45. If we now consider that the worm gear 43 is held against rotation, the worm 44 will be caused to move downwardly by the rotation of the reset shaft 45. This downward movement of the worm can be continued until the washer 47 engages the upper end of the stop sleeve 49. When the actuating spring 48 has been compressed to the limit, the reset crank 55 is released and the lock spring 57 will return the crank to the position illustrated in full lines in Figs. 3 and 5.

As the adjusting screw 27 is only intended to be rotated by the spring actuated or powered gear set 43—44 when the sag in the flexible transmission member 22 exceeds the normal depth or amount, it becomes necessary to provide means for holding the adjusting screw 27 against rotation when the normal amount of sag is present in the flexible transmission member. This adjusting screw holding means consists of a ratchet wheel 58 which is illustrated in Figs. 1 to 4 inclusive as being keyed to the end portion of the adjusting screw 27 that is journaled in the side plate 10. Operatively associated with this ratchet wheel 58 is a pawl 59 that is pivotally mounted on the pawl pin 60. Figs. 3 and 4 clearly illustrate this pawl pin as being suitably attached to the fulcrum block 24. A pawl return spring 61 functions to retain the pawl 59 in its ratchet wheel holding position and to return the pawl to such position after it has been pivoted to release the ratchet wheel.

Operation of the adjusting screw holding pawl 59 is accomplished by the double ended control cam plate 62. Fig. 4 clearly illustrates this control cam plate as being journaled on the boss or projection 63 formed on the fulcrum block 24. A snap ring 64 functions to retain this double ended control cam plate 62 in position on the boss or projection 63.

Fig. 1 discloses the control cam plate 62 as having an arcuate slot 65 formed therein to accommodate the pawl pin 60. This slot will permit the plate 62 to move relative to the pin 60. A pawl actuating or releasing pin 66 is carried by the cam plate 62 and functions to trip or release the pawl when the control cam plate is moved in a counterclockwise direction, as viewed in Fig. 1. A cam plate return spring 67 functions to normally urge the cam plate in a clockwise direction, as viewed in Fig. 1. Engagement of the pawl pin 60 with one end of the arcuate slot 65 will limit angular movement of the cam plate 62 by its return spring 67.

It will be noted by particularly inspecting Fig. 1 that the control cam plate 62 has oppositely directed cam surfaces 68 which are presented to the projecting end portions of the actuating pins 41. It will be recalled that these pins also function as pivot pins for connecting the shoes 40 to the ends of the sag producing levers 37.

Fig. 1 discloses the flexible transmission member 22 as having the normal depth or amount of sag provided in the non-driving run, or upper run, of the same. When this normal amount of sag exists, the actuating pin 41 of the shoe that produces the sag is spaced a desired distance from the cam surface 68, of the control cam plate, which is presented to this pin 41. As increments of wear or stretch develop in the flexible transmission member 22 and bring about an elongation of this member, the actuating pin 41 of the sag producing shoe 40 will be moved toward and finally into engagement with the cam surface 68.

As soon as the sag exceeds the normal amount by a predetermined value, the actuating pin 41 brings about movement of the control cam plate 62 a sufficient distance to cause its pawl release pin 66 to engage the pawl 59 and pivot the latter to release the ratchet wheel 58. When this ratchet wheel is released, the spring powered gear set 43—44 will be actuated and will effect rotation of the actuating screw 27. Rotation of the actuating screw will cause the fulcrum blocks 23 and 24 to be moved toward each other for moving the control or actuating levers 31 in the same direction. The final result will be that the opposed pairs of wheels 20, forming the two V-pulleys, will be moved toward each other to increase the effective diameters of both pulleys.

This increase in effective diameters will eliminate sag from the flexible transmission member 22. As the sag is eliminated, the actuating pin 41, of the sag producing shoe 40, will be moved outwardly and will permit the return spring 67 to move the control cam plate 62 in a clockwise direction. This movement of the cam plate 62 finally results in causing the pawl release pin 66 to be moved out of engagement with the pawl 59 whereby the spring 61 will return the pawl to its ratchet wheel holding position and further rotation of the actuating screw 27 by the spring powered gear set 43—44 will stop.

It will be appreciated that the depth or amount of sag allowed the flexible transmission member 22 may be very accurately controlled. This control is accomplished by the contour of the cam surfaces 68, the normal positioning of the effective cam surface 68 with respect to the effective actuating pin 41 and by the normal spacing between the pawl release pin 66 and the portion of the pawl 59 which is engaged by said pin.

It is to be understood that the form of this invention herewith shown and described is to be taken as the preferred example of the same, and that various changes in the shape, size, and arrangement of parts may be resorted to without departing from the spirit of the invention or the scope of the subjoined claims.

Having thus described the invention, I claim:

1. In variable speed transmissions of the parallel shaft type, a contractible and expansible V-pulley mounted on each shaft and each including a pair of relatively movable members having opposed conical contact surfaces, relatively movable control levers for the pairs of relatively movable members pivoted on opposite sides of said pulleys, a flexible transmission member trained over said pulleys for intimate contact with the same at their respective effective diameters, means for constantly applying force thereagainst to produce a sag therein and to increase the depth of the sag as slack develops in the transmission member, means to move the pivots for said control members toward each other for simultaneously increasing the effective diameters of both of said pulleys to reduce the amount of sag in the flexible transmission member, and means for rendering said pivot moving means operative when the depth of the sag has increased a predetermined amount beyond normal and for rendering said pivot moving means inoperative when the sag has been reduced to the normal amount.

2. In a variable speed transmission of the parallel shaft type, a contractible and expansible V-pulley mounted on each shaft and each including a pair of relatively movable members having opposed conical contact surfaces, control members for the pairs of relatively movable members supported by separate pivots on opposite sides of said pulleys, a flexible transmission member trained over said pulleys for intimate contact with the same at their respective effective diameters, spring powered means engageable with the flexible transmission member for constantly applying force thereagainst to produce a sag therein and for increasing said sag as slack develops in the transmission member, spring powered means to move the separate pivots for the said control members toward each other for simultaneously increasing the effective diameters of both of said pulleys to reduce the amount of sag in the flexible transmission member, and means for rendering said pivot moving means operative when the depth of the sag has increased a predetermined amount beyond normal and for rendering said pivot moving means inoperative when the sag has been reduced to the normal amount.

3. In variable speed transmissions of the parallel shaft type, a contractible and expansible V-pulley mounted on each shaft, each of said pulleys including a pair of relatively movable members having opposed contact surfaces, control members for the pairs of relatively movable members pivoted on opposite sides of said pulleys, means for adjusting said control members about their pivots to vary the effective diameters of said pulleys in opposite directions, a flexible transmission member trained over said pulleys for intimate contact with the same at their respective effective diameters, means engageable with the flexible transmission member for constantly applying force thereagainst in such a manner as to produce a sag therein and to provide the flexible transmission member with the desired tension only when said transmission member has a normal amount of sag therein, said means operating to increase the depth of the sag as slack develops in the transmission member, means to move the pivots for the control members toward each other for simultaneously increasing the effective diameters of both of said pulleys to reduce the amount of sag in the flexible transmission member, and means for rendering said pivot moving means operative when the depth of the sag has increased a predetermined amount beyond normal and for rendering said pivot moving means inoperative when the sag has been reduced to the normal amount.

4. In variable speed transmissions of the parallel shaft type, a contractible and expansible V-pulley mounted on each shaft and each including a pair of relatively movable members having opposed conical contact surfaces, control levers for the pairs of relatively movable members arranged on opposite sides of the V-pulleys, a fulcrum block on each side of the V-pulleys for pivotally mounting said control levers, a flexible transmission member trained over said pulleys for intimate contact with the same at their respective effective diameters, means engageable with the flexible transmission member for constantly applying force thereagainst to produce a sag therein, an adjustable screw rotatable to move the fulcrum blocks toward each other for simultaneously increasing the effective diameters of both of said pulleys, means to turn the adjusting screw to increase the effective diameters of said pulleys so as to reduce the amount of sag in the flexible transmission member, and means for rendering said adjusting screw turning means operative when the depth of the sag has increased a predetermined amount beyond normal and for rendering said adjusting screw turning means inoperative when the sag has been reduced to the normal amount.

5. A variable speed transmission comprising parallel driver and driven shafts, a contractible and expansible V-pulley mounted on each shaft and each pulley including a pair of relatively movable members having opposed conical contact surfaces, control levers for the pairs of relatively movable members arranged on opposite sides of the V-pulleys, a fulcrum block on each side of the V-pulleys for pivotally mounting said control levers, means for adjusting the said control levers about their pivots to vary the effec-
tive diameters of said pulleys in opposite directions, a flexible transmission member trained over said pulleys for intimate contact with the same at their respective effective diameters, spring powered means engageable with the flexible transmission member for constantly applying force thereagainst to produce a sag therein, an adjusting screw rotatable to move the fulcrum blocks toward each other for simultaneously increasing the effective diameters of both of said pulleys, spring powered means to turn the adjusting screw to increase the effective diameters of said pulleys so as to reduce the amount of sag in the flexible transmission member, and means for rendering said adjusting screw turning means operative when the depth of the sag has increased a predetermined amount beyond normal and for rendering said adjusting screw turning means inoperative when the sag has been reduced to the normal amount.

6. In variable speed transmissions of the parallel shaft type, a contractible and expansible V-pulley mounted on each shaft and each including a pair of relatively movable members having opposed conical contact surfaces, a flexible transmission member trained over said pulleys for intimate contact with the same at their respective effective diameters, means to provide the flexible transmission member with the desired tension when producing a normal amount of sag in said member, means for simultaneously increasing the effective diameters of both of said pulleys to reduce the amount of sag in the flexible transmission member, and means for rendering said sag reducing means operative when sufficient slack develops in the flexible transmission member to cause the depth of the sag to increase beyond said normal amount and to render said sag reducing means inoperative when the sag has again been returned to said normal amount.

7. In variable speed transmissions of the parallel shaft type, a contractible and expansible V-pulley mounted on each shaft and each including a pair of relatively movable members having opposed conical contact surfaces, a flexible transmission member trained over said pulleys for intimate contact with the same at their respective effective diameters, means to provide the flexible transmission member with the desired tension when producing a normal amount of sag in said member, means for simultaneously increasing the effective diameters of said pulleys to reduce the amount of sag in the flexible transmission member, and means controlled by the sag producing means for rendering said sag reducing means operative when sufficient slack develops in the flexible transmission member to cause the depth of the sag to increase beyond said normal amount and to render said sag reducing means inoperative when the sag has again been returned to said normal amount.

8. In variable speed transmissions of the parallel shaft type, a contractible and expansible V-pulley mounted on each shaft and each including a pair of relatively movable members having opposed conical contact surfaces, relatively movable control levers for the pairs of relatively movable members pivoted on opposite sides of said pulleys, a flexible transmission member trained over said pulleys for intimate contact with the same at their respective effective diameters, means engageable with the flexible transmission member for constantly applying force thereagainst to produce a sag therein and to increase the depth of the sag as slack develops in the transmission member, means to move the pivots for said control members toward each other for simultaneously increasing the effective diameters of both of said pulleys to reduce the amount of sag in the flexible transmission member, and means controlled by the operation of the sag producing means for rendering said pivot moving means operative when the depth of the sag has increased a predetermined amount beyond normal and for rendering said pivot moving means inoperative when the sag has been reduced to the normal amount.

9. In a variable speed transmission of the parallel shaft type, a contractible and expansible V-pulley mounted on each shaft and each including a pair of relatively movable members having opposed conical contact surfaces, control members for the pairs of relatively movable members supported by separate pivots on opposite sides of said pulleys, a flexible transmission member trained over said pulleys for intimate contact with the same at their respective effective diameters, spring powered means engageable with the flexible transmission member for constantly applying force thereagainst to produce a sag therein and for increasing said sag as slack develops in the transmission member, spring powered means to move the separate pivots for the said control members toward each other for simultaneously increasing the effective diameters of both of said pulleys to reduce the amount of sag in the flexible transmission member, and means controlled by the operation of the sag producing means for rendering said pivot moving means operative when the depth of the sag has increased a predetermined amount beyond normal and for rendering said pivot moving means inoperative when the sag has been reduced to the normal amount.

10. In variable speed transmissions of the parallel shaft type, a contractible and expansible V-pulley mounted on each shaft, each of said pulleys including a pair of relatively movable members having opposed contact surfaces, control members for the pairs of relatively movable members pivoted on opposite sides of said pulleys, means for adjusting said control members about their pivots to vary the effective diameters of said pulleys in opposite directions, a flexible transmission member trained over said pulleys for intimate contact with the same at their respective effective diameters, means engageable with the flexible transmission member for constantly applying force thereagainst in such a manner as to produce a sag therein and to provide the flexible transmission member with the desired tension only when said transmission member has a normal amount of sag therein, said means operating to increase the depth of the sag as slack develops in the transmission member, means to move the pivots for the control members toward each other for simultaneously increasing the effective diameters of both of said pulleys to reduce the amount of sag in the flexible transmission member, and means controlled by the operation of the sag producing means for rendering said pivot moving means operative when the depth of the sag has increased a predetermined amount beyond normal and for rendering said pivot moving means inoperative when the sag has been reduced to the normal amount.

11. In variable speed transmissions of the parallel shaft type, a contractible and expansible V-pulley mounted on each shaft and each including a pair of relatively movable members having opposed conical contact surfaces, control levers for the pairs of relatively movable members arranged on opposite sides of the V-pulleys, a fulcrum block on each side of the V-pulleys for pivotally mounting said control levers, a flexible transmission member trained over said pulleys for intimate contact with the same at their respective effective diameters, means engageable with the flexible transmission member for constantly applying force thereagainst to produce a sag therein, an adjustable screw rotatable to move the fulcrum blocks toward each other for simultaneously increasing the effective diameters of both of said pulleys, means to turn the adjusting screw to increase the effective diameters of said pulleys so as to reduce the amount of sag in the flexible transmission member, and means controlled by the operation of the sag producing means for rendering said adjusting screw turning means operative when the depth of the sag has increased a predetermined amount beyond normal and for rendering said adjusting screw turning means inoperative when the sag has been reduced to the normal amount.

12. A variable speed transmission comprising parallel driver and driven shafts, a contractible and expansible V-pulley mounted on each shaft and each pulley including a pair of relatively movable members having opposed conical contact surfaces, control levers for the pairs of relatively movable members arranged on opposite sides of the V-pulleys, a fulcrum block on each side of the V-pulleys for pivotally mounting said control levers, means for adjusting the said control levers about their pivots to vary the effective diameters of said pulleys in opposite directions, a flexible transmission member trained over said pulleys for intimate contact with the same at their respective effective diameters, spring powered means engageable with the flexible transmission member for constantly applying force thereagainst to produce a sag therein, an adjusting screw rotatable to move the fulcrum blocks toward each other for simultaneously increasing the effective diameters of both of said pulleys, spring powered means to turn the adjusting screw to increase the effective diameters of said pulleys so as to reduce the amount of sag in the flexible transmission member, and means controlled by the operation of the sag producing means for rendering the adjusting screw turning means operative when the depth of the sag has increased a predetermined amount beyond normal and for rendering said adjusting screw turning means inoperative when the sag has been reduced to the normal amount.

13. In variable speed transmissions of the parallel shaft type, a contractible and expansible V-pulley mounted on each shaft and each including a pair of relatively movable members having opposed conical contact surfaces, relatively movable control levers for the pairs of relatively movable members pivoted on opposite sides of said pulleys, a flexible transmission member trained over said pulleys for intimate contact with the same at their respective effective diameters, means engageable with the flexible transmission member for constantly applying force thereagainst to produce a sag therein and to increase the depth of the sag as slack develops in the transmission member, means including a spring driven gear set to move the pivots for the said control members toward each other for simultaneously increasing the effective diameters of both of said pulleys to reduce the amount of sag in the flexible transmission member, and means for rendering said pivot moving means operative when the depth of the sag has increased a predetermined amount beyond normal and for rendering said pivot moving means inoperative when the sag has been reduced to the normal amount.

14. In variable speed transmissions of the parallel shaft type, a contractible and expansible V-pulley mounted on each shaft and each including a pair of relatively movable members having opposed conical contact surfaces, relatively movable control levers for the pairs of relatively movable members pivoted on opposite sides of said pulleys, a flexible transmission member trained over said pulleys for intimate contact with the same at their respective effective diameters, means engageable with the flexible transmission member for constantly applying force thereagainst to produce a sag therein and to increase the depth of the sag as slack develops in the transmission member, means including a spring powered gear set to move the pivots for the said control members toward each other for simultaneously increasing the effective diameters of both of said pulleys to reduce the amount of sag in the flexible transmission member, and means controlled by the operation of the sag producing means for rendering said pivot moving means operative when the depth of the sag has increased a predetermined amount beyond normal and for rendering said pivot moving means inoperative when the sag has been reduced to the normal amount.

15. In variable speed transmissions of the parallel shaft type, a contractible and expansible V-pulley mounted on each shaft and each including a pair of relatively movable members having opposed conical contact surfaces, control levers for the pairs of relatively movable members arranged on opposite sides of the V-pulleys, a fulcrum block on each side of the V-pulleys for pivotally mounting said control levers, a flexible transmission member trained over said pulleys for intimate contact with the same at their respective effective diameters, means engageable with the flexible transmission member for constantly applying force thereagainst to produce a sag therein, an adjusting screw rotatable to move the fulcrum blocks toward each other for simultaneously increasing the effective diameters of both of said pulleys, a spring driven gear set to turn the adjusting screw to increase the effective diameters of said pulleys so as to reduce the amount of sag in the flexible transmission member, and means for rendering said adjusting screw turning means operative when the depth of the sag has increased a predetermined amount beyond normal and for rendering said adjusting screw turning means inoperative when the sag has been reduced to the normal amount.

16. In variable speed transmissions of the parallel shaft type, a contractible and expansible V-pulley mounted on each shaft and each including a pair of relatively movable members having opposed conical contact surfaces, control levers for the pairs of relatively movable members arranged on opposite sides of the V-pulleys, a fulcrum block on each side of the V-pulleys for pivotally mounting said control levers, a flexible transmission member trained over said pulleys for intimate contact with the same at their respective effective diameters, means engageable with the flexible transmission member for constantly applying force thereagainst to produce a sag therein, an adjusting screw rotatable to move the fulcrum blocks toward each other for simultaneously increasing the effective diameters of both of said pulleys, a spring driven gear set to turn the adjusting screw to increase the effective diameters of said pulleys so as to reduce the amount of sag in the flexible transmission member, and means controlled by the operation of the sag producing means for rendering said adjusting screw turning means operative when the depth of the sag has increased a predetermined amount beyond normal and for rendering said adjusting screw turning means inoperative when the sag has been reduced to the normal amount.

17. In variable speed transmissions of the parallel shaft type, a contractible and expansible V-pulley mounted on each shaft and each including a pair of relatively movable members having opposed conical contact surfaces, a flexible transmission member trained over said pulleys for intimate contact with the same at their respective effective diameters, means to provide the flexible transmission member with the desired tension when producing a normal amount of sag therein, means including a spring driven gear set for simultaneously increasing the effective diameters of both of said pulleys to reduce the amount of sag therein, and means for rendering said sag reducing means operative when sufficient slack develops in the flexible transmission member to cause the depth of the sag to increase beyond said normal amount and to render said sag reducing means inoperative when the sag has again been returned to said normal amount.

18. In variable speed transmissions of the parallel shaft type, a contractible and expansible V-pulley mounted on each shaft and each including a pair of relatively movable members having opposed conical contact surfaces, a flexible transmission member trained over said pulleys for intimate contact with the same at their respective effective diameters, means to provide the flexible transmission member with the desired tension when producing the normal amount of sag in the flexible transmission member, means including a spring driven gear set for simultaneously increasing the effective diameter of both of said pulleys to reduce the amount of sag in the transmission member, and means controlled by the sag producing means for rendering said sag reducing means operative when sufficient slack develops in the flexible transmission member to cause the depth of the sag to increase beyond said normal amount and to render said sag reducing means inoperative when the sag has again been returned to said normal amount.

19. A variable speed transmission comprising parallel driver and driven shafts, a contractible and expansible V-pulley mounted on each shaft and each pulley including a pair of relatively movable members having opposed conical contact surfaces, control levers for the pairs of relatively movable members arranged on opposite sides of the V-pulleys, a fulcrum block on each side of the V-pulleys for pivotally mounting said control levers, means for adjusting the said control levers about their pivots to vary the effective diameters of said pulleys in opposite directions, a flexible transmission member trained over said pulleys for intimate contact with the same at their respective effective diameters, spring powered means engageable with the flexible transmission member for constantly applying force thereagainst to produce a sag therein, an adjusting screw rotatable to move the fulcrum blocks toward each other for simultaneously increasing the effective diameters of both of said pulleys, spring powered means to turn the adjusting screw to increase the effective diameters of said pulleys so as to reduce the amount of sag in the flexible transmission member, means for holding the adjusting screw from being turned by the spring powered means, and means for rendering said screw holding means inoperative when the depth of the sag has increased a predetermined amount beyond normal and for rendering said screw holding means operative again when the depth of the sag has been returned to normal.

20. In variable speed transmissions of the parallel shaft type which includes contractible and expansible V-pulleys mounted on the shafts and a flexible transmission member trained over said pulleys, the improvement which comprises means for producing a sag in the flexible transmission member to tension said member, means for reducing the amount of sag in said member, and means controlled by operation of the sag producing means to render the sag reducing means operative when the depth of the sag has increased a predetermined amount beyond normal and to render the sag reducing means inoperative when the sag has been reduced to the normal amount.

21. In variable speed transmissions of the parallel shaft type which include contractible and expansible V-pulleys mounted on the shafts and flexible transmission members trained over said pulleys, the improvement which comprises spring powered means for producing a sag in the flexible transmission member to tension said member, spring powered means for reducing the amount of sag in said member, and means controlled by operation of the sag producing means to render the sag reducing means operative when the depth of the sag has been increased a predetermined amount beyond normal and to render the sag reducing means inoperative when the sag has been reduced to the normal amount.

22. In variable speed transmissions of the parallel shaft type which include contractible and expansible V-pulleys mounted on the shafts and flexible transmission members trained over said pulleys, the improvement which comprises spring powered means for producing a sag in the flexible transmission member to tension said member, spring powered means for reducing the amount of sag in said member, and a pawl and ratchet mechanism controlled by operation of the sag producing means to render the sag reducing means operative when the depth of the sag has increased a predetermined amount beyond normal and to render the sag reducing means inoperative when the sag has been reduced to the normal amount.

23. In variable speed transmissions of the parallel shaft type which include contractible and expansible V-pulleys mounted on the shafts and flexible transmission members trained over said pulleys, the improvement which comprises means for producing a sag in the flexible transmission member to tension said member, means for reducing the amount of sag in said member, and a pawl and ratchet mechanism controlled by operation of the sag producing means to render the sag reducing means operative when the depth of the sag has increased a predetermined amount beyond normal and to render the sag reducing means inoperative when the sag has been reduced to the normal amount.

24. In variable speed transmissions of the parallel shaft type which include contractible and expansible V-pulleys mounted on the shafts and flexible transmission members trained over said pulleys, the improvement which comprises spring powered means for producing a sag in the flexible transmission member to tension said member, means including a spring driven gear set for reducing the amount of sag in said member, and means controlled by operation of the sag producing means to render the sag reducing means operative when the depth of the sag has increased a predetermined amount beyond normal and to render the sag reducing means inoperative when the sag has been reduced to the normal amount.

25. In variable speed transmissions of the parallel shaft type which include contractible and expansible V-pulleys mounted on the shafts and flexible transmission members trained over said pulleys, the improvement which comprises means for producing a sag in the flexible transmission member to tension said member, means including a spring driven gear set for reducing the amount of sag in said member, and means controlled by operation of the sag producing means to render the sag reducing means operative when the depth of the sag has increased a predetermined amount beyond normal and to render the sag reducing means inoperative when the sag has been reduced to the normal amount.

26. In variable speed transmissions of the parallel shaft type which include contractible and expansible V-pulleys mounted on the shafts and flexible transmission members trained over said pulleys, the improvement which comprises spring powered means for producing a sag in the flexible transmission member to tension said member, means including a spring driven gear set for reducing the amount of sag in said member, and a pawl and ratchet mechanism controlled by operation of the sag producing means to render the sag reducing means operative when the depth of the sag has increased a predetermined amount beyond normal and to render the sag reducing means inoperative when the sag has been reduced to the normal amount.

HENRY G. KELLER.